INVENTOR.
BENJAMIN H. CISCEL

BY [signature]

ATTORNEY

United States Patent Office 2,946,542
Patented July 26, 1960

2,946,542

AUTOMATIC PILOT FOR AIRCRAFT WITH ACCELERATION MONITORING MEANS

Benjamin H. Ciscel, Medford Lakes, N.J., assignor to Minneapolis-Honeywell Regulator Company, Minneapolis, Minn., a corporation of Delaware Filed Feb. 2, 1956, Ser. No. 563,051

26 Claims. (Cl. 244—77)

This invention relates to automatic pilots for aircraft and concerns an arrangement associated with the automatic pilot as a structural protection device for the craft. Structural protection may be achieved in one instance by limiting accelerations of the craft which if unrestricted would possibly result in the collapse of the wing elements of the aircraft or airplane or could result in other structural failure of the craft.

Acceleration limiting is a complicated problem in execution. The concept of sensing the fact of undue acceleration of the craft and then shutting off the offending equipment has considerable appeal. However, the manner of disengagement of the offending equipment from control of the craft and the timing involved within is quite critical.

The dynamics of the situation relating to such disengagement involves the response times of the airplane, the surface controls, the automatic control equipment or autopilot, the acceleration sensing equipment, and the control system itself responsive thereto for effecting disengagement.

An object of this invention therefore is to provide a novel apparatus for protecting an aircraft in flight against structural failures due to excessive accelerations.

A further object of this invention is to provide a novel arrangement responsive to accelerations of the craft in a direction tending to collapse the wings of the craft for protecting the craft against accelerations above a predetermined magnitude.

A further object of this invention is to provide a novel arrangement responsive to both normal and angular accelerations of the craft.

A further object of this invention is to provide a novel simplified arrangement based on two linear responsive accelerometers arranged to be responsive to normal and angular accelerations of the craft and providing an effect involving both normal and angular accelerations quantities.

A further object of this invention is to provide monitoring apparatus for an airplane responsive to both craft normal and angular accelerations about the craft pitch axis derived from two linear acceleration responsive devices said apparatus serving to disengage a control system for the craft elevator surface automatically, while permitting the pilot of the craft to attend to other duties.

Other objects of the invention not thus far more particularly stated will become clearly evident from the following detailed description of a preferred embodiment of the invention when considered in connection with the accompanying drawings wherein.

Figure 1:
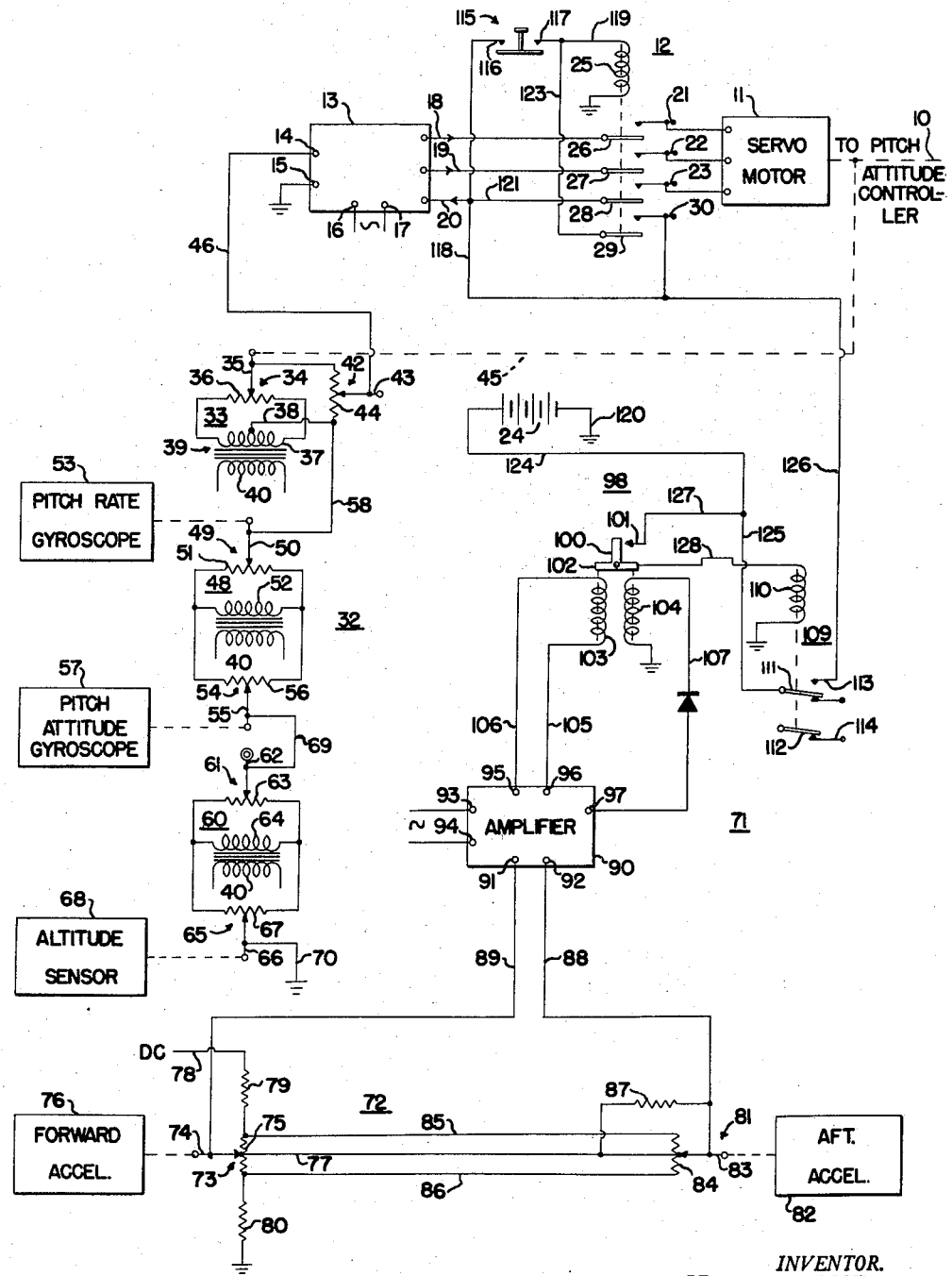
Figure 1 illustrates an automatic pilot for positioning the elevator surface with acceleration means for disengagement of the automatic pilot from the surface.

According to the invention, a servomotor may be operatively connected with a pitch attitude control surface of an aircraft. The servomotor may be reversibly controlled from an amplifier. The amplifier in turn is controlled by a balancable network herein illustrated as a series summing A.C. signal voltage network which may be unbalanced to cause servomotor operation and displacement at the surface to accelerate the craft.

A pair of accelerometers responsive to linear accelerations are spaced longitudinally in the craft one being in the forward part of the airplane and the other in the after part of the airplane so as to be subject to accelerations along the vertical or Z axis of the craft and also responsive to angular accelerations of the craft about its pitch axis. The dual responses of the two accelerometers are reflected in a resultant signal voltage having both angular acceleration and normal acceleration effects. When the resultant signal exceeds a predetermined quantity, indicating that the craft is exceeding a desired normal acceleration or a combination of normal and angular accelerations, the servomotor is rendered ineffective to further position the attitude control surface of the craft. The surface is now permitted to align itself with the airstream and the accelerations of the craft are reduced.

For a fuller understanding of the invention, reference is made to the following detailed description of the components thereof and their interrelation. Referring to the drawing Figure 1, an operating means 10 which may be connected to an attitude control device such as the elevator surface (not shown) of the airplane may be operatively connected to or disconnected from a servomotor 11. The servomotor 11 may be of the type including a constantly rotating motor which may be operatively coupled in two manners to operator 10 to reversibly control the operator. The servomotor may be of the type disclosed in a patent to Hamby 2,466,702 dated April 12, 1949 or the application of Willis H. Gille Serial No. 447,989 filed June 1942 now Patent Number 2,750,602.

An engage relay 12 serves to couple the servomotor 11 to a known servomotor control amplifier 13. The amplifier 13 is of the A.C. discriminator type and comprises A.C. signal input terminals 14, 15 and A.C. power input terminals 16, 17. The amplifier includes a pair of operable (not shown) relays which are alternatively energized depending upon the phase relationship of the voltage across terminals 14, 15 and the voltage across terminals 16, 17.

The engage relay 12 is of the four pole-single make type comprising an operating winding 25 and operable arms 26, 27, 28, and 29. The arms engage respectively with relay in contacts 21, 22, 23, and 30.

Control signal voltages applied across amplifier terminals 14, 15 are derived from a balanceable, series summing, A.C. signal voltage network 32. Network 32 comprises a servomotor follow up signal generator 33, a craft pitch rate-craft pitch attitude signal generator 48, a trim-altitude error signal network 60.

Signal generator 33 comprises a follow up potentiometer 34, a transformer 39, and a ratio or voltage dividing potentiometer 42. Potentiometer 34 comprises a slider 35 and resistor 36 which is connected across a secondary winding 37 of the transformer which includes a primary winding 40. Potentiometer 42 comprises a slider or adjustable tap 43 and resistor 44 which is connected between a center tap 38 of secondary winding 37 and slider 35. Slider 35 may be moved in either direction along resistor 36 from a normal position thereon by a suitable operating means 45 connected to the pitch attitude controller operator 10. A conductor 46 connects amplifier terminal 14 with adjustable tap 43.

Signal generator 48 comprises a pitch rate potentiometer 49, a pitch attitude potentiometer 54, and a secondary winding 52 of a transformer. Since a single primary winding of a transformer may supply a plurality of secondary windings, the secondary winding of each signal generator is indicated as having a common primary winding. Potentiometer 49 comprises an adjusting slider 50 and resistor 51 connected across secondary winding 52. Potentiometer 54 comprises a slider 55 and resistor 56 connected across secondary winding 52 in parallel with resistor 51. Potentiometer slider 50 may be positioned in either direction along resistor 51, from a normal position, by a pitch rate gyroscope 53 sensing craft rate of change of pitch attitude. A conductor 58 connects slider 50 to the center tap 38 of secondary winding 37. Slider 55 may be positioned in either direction along resistor 56 from a normal position thereon in accordance with the pitch attitude of the craft by a pitch attitude change responsive gyroscope 57.

Signal generator 60 comprises a trim potentiometer 61, an altitude error potentiometer 65, and a secondary winding 64 of the transformer 39. Potentiometer 61 includes an adjustable slider 62 and resistor 63 which is connected across secondary winding 64. Potentiometer 65 comprises an adjustable slider 66 and resistor 67 connected in parallel across secondary winding 64. Slider 62 may be positioned in either direction from a normal position on resistor 63. A conductor 69 connects slider 55 and slider 62. Slider 66 may be positioned in either direction along resistor 67 from a normal position thereon in accordance with the change in altitude of the craft detected by an altitude sensor 68 operatively connected to slider 66. A conductor 70 connects slider 66 to ground whereby the amplifier input circuit is completed to an amplifier ground conductor connected to terminal 15.

Thus far we have described the elements of an elevator control channel of a conventional automatic pilot for which no novelty is claimed herein. Associated with this automatic pilot is the acceleration monitoring and protective apparatus 71 to be described. The monitoring and protective arrangement 71 comprises an acceleration sensing system 72, an amplifier 90, electrically operated switch means 98 and a monitoring relay 109.

The acceleration responsive arrangement 72 comprises one forwardly positioned potentiometer 73 having an adjustable slider 74 and resistor 75. Slider 74 may be displaced in either direction from a center tap conductor 77 of resistor 75 by an accelerometer 76 having a position in the craft forward of the C.G. thereof. An energizing circuit for resistor 75 comprises in series an energized D.C. conductor 78, resistor 79, potentiometer resistor 75, and a resistor 80 having its opposite end connected to ground. Connected in parallel to potentiometer resistor 75 is a potentiometer resistor 84 of an aft positioned, accelerometer responsive potentiometer 81. The potentiometer includes an adjustable slider 83 positioned by an accelerometer 82, located off of the C.G. of the craft, in either direction from a center tap conductor 77 of resistor 84. Conductors 85 and 86 connect the ends of potentiometer resistor 84 to the opposed ends of potentiometer resistor 75. A loading or gain control resistor 87 is connected between adjustable slider 83 and the center tap conductor 77 for purposes to be described. Conductors 88 and 89 respectively connected to sliders 83 and 74 constitute the output elements for the acceleration sensing arrangement 72. The voltage output across conductors 88, 89 is a combination of the normal acceleration of the aircraft along its Z or vertical axis and the angular acceleration of the craft about its lateral or pitch axis.

The feature of the arrangement 72 whereby the combined normal acceleration and angular acceleration can be obtained will now be considered. The accelerometer 76 and 82 are referred to as linear accelerometers and respond to linear motions normal to the craft lateral axis or acceleration along the craft vertical axis rather than to angular motions. It is evident however that with the accelerometers displaced forwardly and rearwardly from the center of gravity of the aircraft in the direction of its longitudinal axis that due to such displacement they will respond also to angular accelerations as well as linear accelerations. By consideration of the arrangement, it will be evident that when normal acceleration alone is applied to the accelerometers, that both sliders 74 and 83 will move equally in the same direction; that is both will move downwardly or both will move upwardly. On the other hand, when angular acceleration alone is operating on the accelerometers one accelerometer slider 74 would move in one direction whereas the other accelerometer slider 83 would move equally but in the opposite direction. Disregarding the distance of each accelerometer from the aircraft center of gravity or letting it equal one unit distance, the outputs for each accelerometer are $$O_f = A_n + \ddot{\theta}$$
$$O_a = A_n - \ddot{\theta}$$

where:

$O_f$ is output of the forward accelerometer
$O_a$ is output of the aft accelerometer
$A_n$ is normal acceleration
$\ddot{\theta}$ is pitch angular acceleration As evident from the above, the difference of the two outputs is:

$$O_f - O_a = \ddot{\theta} + \ddot{\theta}$$

and the sum is:

$$O_f + O_a = 2A_n + \ddot{\theta} - \ddot{\theta}.$$

From the above, the difference gives the angular acceleration and the sum gives the normal acceleration.

It will be evident from arrangement 72 that in angular accelerations, the sliders of signal providing potentiometers 73, 81 move in opposite directions; consequently by connecting together the center taps of their resistors the sum of their signals appear across conductors 88, 89. In effect there is straight series summing of the outputs of two potentiometers.

On the other hand, during normal accelerations or those in the direction of the turn or vertical axis of the craft, the two sliders 74 and 83 move in the same direction and they are arranged in opposition so that their outputs would tend to cancel each other. To avoid complete cancellation of the normal accelerations, the resistor 87 is provided to make the gains for the two accelerometers different so that a normal acceleration is also obtained. Thus the output across conductors 88, 89 is a combination of angular and normal accelerations. It is to be understood that in the arrangement the accelerometers 76, 82 are preferably equally spaced longitudinally from the center of gravity of the aircraft. Unequal spacing from the C.G. also affects the "gains" of the accelerometer.

Amplifier 90 is of the A.C. discriminator type and comprises a pair of control signal voltage terminals 91, 92; power input terminals 93, 94, output terminals 95, 96, and a reference output terminal 97. It may be of the type illustrated in Figure 8 (pg. 237) of vol. 5 "Proceedings of the Nat. Electronics Conf.," 1949. It may include suitable means for converting the D.C. control signals across terminals 91, 92 to A.C. voltage signals.

The motorized switch 98 comprises an inverted T-shaped contactor 100 supported on a pivot 102 and engageable with a contact 101. The switch 98 includes two operating windings 103, 104. Winding 103 is operated from the output conductors 105, 106 of amplifier 90 whereas winding 104 is energized from a reference voltage by a conductor 107.

The operation of the switch 98 is best understood as being that of a balanced relay. That is, the armature 102 is in a balanced position for the conditions of no current in windings 103 and 104, and for the condition of balanced (equal) currents in coils 103 and 104. To give the system fail-safe operation, a reference voltage source 107 is taken from the amplifier 90. This reference voltage, producing a D.-C. current through coil 104, moves armature 102 in such a direction as to close contact 101 to arm 100. This closes a circuit from the battery 24, conductor 124, conductor 127, contact 101, arm 100, conductor 128, coil 110 and thence via the ground to conductor 120. Thus, when present, the reference voltage energizes relay 109, and permits engagement. When the reference voltage is absent, there is no protection, and the system cannot be engaged. The reference voltage appearing at terminal 97 of amplifier 90 is taken from an internal transformer (not shown) within 90.

The output of amplifier 90, which is a D.-C. current proportional to the aircraft accelerations measured by accelerometers 76 and 82, appears on terminals 95 and 96. Conductors 105 and 106 carry the acceleration current to coil 103 of switch 98. When the acceleration current reaches the limit value, coil 103 balances coil 104, armature 102 comes to its neutral position, and contact 101 is opened. As explained below, this opens the engage circuits so as to disengage the autopilot system.

Because the motorized switch (or balance relay) 98 used in practice was incapable of carrying the required amount of current, a second relay 109 was employed as a repeater. Relay 109 is not essential to the invention for any functional reasons. Contact 113 and arm 111 merely repeat the action of contact 101 and arm 100.

Relay 109 comprises an operating winding 110 for operating arms 111, 112 with respect to contacts 113, 114.

Having completed a description of the components of the arrangement their coaction will now be described. It is evident that the arrangement includes a battery 24 as a source of D.C. supply and a normally open manually operable momentarily closed engage switch 115 which bridges switch contacts 116, 117.

Preliminary to operatively engaging the servomotor 11, with a pitch attitude controller operator 10, it is assumed that the craft is directly manually controlled during which the pitch attitude controller operator 10 may be manually positioned to place the craft in the desired pitch attitude. In this attitude, the network may be balanced by adjusting trim knob slider 62 and assuming that no excessive accelerations affect the craft, the engage switch 115 may be closed to complete a relay energizing circuit through arrangement circuit 71 from battery 24, conductor 124, conductor 125, relay arm 111, contact 113, conductor 126, conductor 118, engage switch 115, conductor 119, operating winding 25 of engage relay 12 to ground and return to battery ground 120. In order for arrangement 71 to energize the conductor 118 from the battery 24, balance relay 98 must have closed contact 101 with arm 100. This, by means of energized relay 109 closes contact 113 with arm 111. The relay 12 operates and completes a servomotor engage circuit from energized conductor 118, branch conductor 121, engage relay arm 28, in contact 23, to servomotor 11 and return to battery ground 120. This circuit energizes the "brake windings" if the servomotor 11 be of the type disclosed in the Hamby patent or the Gille application referred to. This operatively connects the servomotor 11 with the pitch attitude controller operator 10. Conversely, removing energy from the servomotor 11 disengages the motor from the pitch attitude controller 10.

The network 32 as stated may have been adjusted to the balance condition for the attitude of the aircraft by operating the trim knob 62 of potentiometer 61. If after engagement, the network 32 becomes unbalanced due to a change in pitch attitude which is reflected in the movement of slider 55 by gyroscope 57 and movement of slider by rate gyroscope 53, a control signal is applied across servo amplifier terminals 14, 15. If the relative phase of the two voltages across terminals 14, 15 and across terminals 16, 17 be of one relation, a servo operating circuit is completed through one amplifier operating relay (not shown) from energized conductor 118, amplifier D.C. power input conductor 20, through the amplifier operated relay, conductor 18, engage relay arm 26, in contact 21, to one clutch winding of servomotor 11. The energization of the clutch winding will cause the servomotor 11 to position the pitch attitude controller operator 10 and during such operation the servo controlled operating means 45 positions slider 35 to rebalance network 32 and thus terminate operation of the servomotor.

If the phase of the voltage across terminals 14, 15 with respect to that across terminals 16, 17 be of an opposite relation, a circuit is completed from amplifier D.C. input conductor 20, the other amplifier relay, conductor 19, relay arm 27, in contact 22, to the other servomotor clutch winding. Servomotor 11 would rotate in the opposite direction to position the pitch attitude controller operator 10 and again through the operating means 45 position slider 35 to rebalance network 32.

It is assumed that the autopilot may control the pitch attitude controller of the craft so that accelerations in access of a predetermined value will be exceeded. Such excessive accelerations could be obtained from the operation of the sensing devices 53, 57, or 68 or again, the excessive acceleration might result from some malfunction in the system for example failure to position the follow up slider 35 or failure of providing a follow up or rebalance signal. This failure would result in the servomotor 11 operating the pitch attitude controller as long as the network 32 were unbalanced and could conceivably result in accelerations of the craft above that desired. The desired limit of acceleration could be selected by varying the energization of winding 103, or by adjusting the gain of amplifier 90, or by selection of resistors 79 and 80, or by a combination of these effects.

It will be appreciated that while the engage switch 115 is only momentarily closed, yet it is closed a sufficient time for the relay 12 to operate and complete a holding circuit comprising battery 24, conductor 124, conductor 125, relay arm 111, contact 113, conductor 126, engage relay in contact 30, relay arm 29, conductor 123, conductor 119, engage relay operating winding 25, to ground and return to battery ground 120. As explained previously, the system is interlocked with the acceleration limiter so as to prevent engagement if the reference current is not present in coil 104 to cause closing of contact 101 and armature 100. By conductors 127 and 128, coil 110 of relay 109 is energized thus closing contact 113 with arm 111.

Should the craft exceed a limit value of acceleration which may be either due solely to normal acceleration or solely to angular acceleration or again to a combination of normal and angular accelerations so that the energization of winding 103 by amplifier 90 exceeds the energization of winding 104, the contactor 100 will open from contact 101. An autopilot disconnect circuit is thereby caused from energized conductor 124, conductor 127, open contact 101, tiltable contactor 100, conductor 128, relay winding 110, to ground and return to battery ground 120. Removing the voltage from operating winding 110 of relay 109 disengages relay arm 111 from contact 113. This disengagement of relay arm 111 from contact 113 opens the holding circuit for the operating winding 25 of engage relay 12 which thereupon drops to the out position. As relay 12 drops out, relay arm 28 is disengaged from in contact 23 to break the circuit for energizing the "brake windings" of servomotor 11 thereby operatively disconnecting servomotor 11 from the pitch attitude controller operator 10 and rendering the servomotor ineffective.

With the servomotor 11 operatively disconnected from the pitch attitude controller operator 10, the elevator surface of the craft positioned by the controller operator 10 if displaced from a normal position would have aerodynamic loading causing it to be streamlined. Thus with the elevator surface no longer exerting a turning moment on the craft, the accelerations affecting the craft are decreased. With such decrease in accelerations, the structure of the aircraft is protected against failure which would otherwise occur if the accelerations were permitted to increase beyond the predetermined limit set.

When the accelerations of the craft have decreased to below the limit set, the autopilot may be engaged by operating the engage switch 115 as in the initial engagement of the servomotor 11 and pitch attitude controller operator 10.

Figure 2:
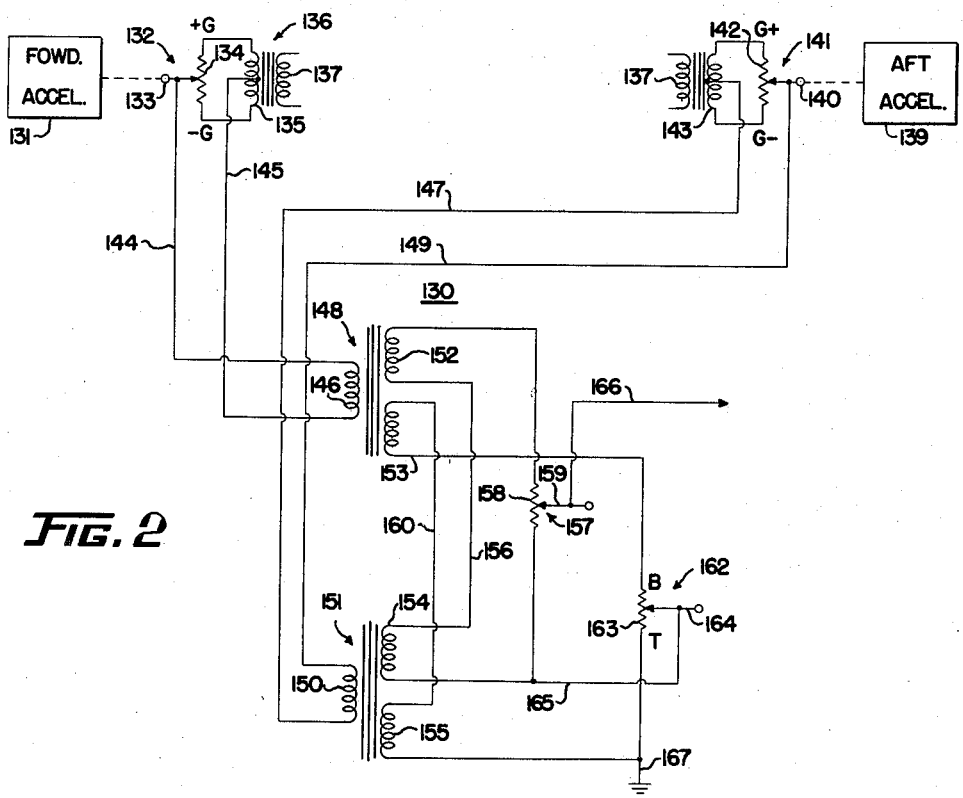
Figure 2 represents a modification of a portion of Figure 1 relating to the normal and angular acceleration signal providing means.

In Figure 2 there is shown an alternative method of deriving a combined normal acceleration and angular acceleration voltage signal by an arrangement 130 corresponding generally to the arrangement 72 of Figure 1. In Figure 2, a forward located accelerometer 131 operates a slider 133 over a potentiometer resistor 134 of potentiometer 132. The resistor 134 is energized by a secondary winding 135 of a transformer 136 having a primary winding 137. An accelerometer 139 located aft operates a slider 140 over a resistor 142 of a potentiometer 141. Resistor 142 is energized from a secondary winding 143 of transformer 136. Signals are developed between slider 133 and a center tap of secondary winding 135, and similarly signals are developed between the slider 140 and a center tap of secondary winding 143. Conductors 144 and 145 connect slider 133 and the center tap of secondary winding 135 to the opposite ends of a primary winding 146 of a summing transformer 148. Similarly conductors 147, 149 connect slider 140 and the center tap of secondary winding 143 to the ends of a primary winding 150 of a second summing transformer 151. The connections between sliders 133, 140 and their respective primary windings 146, 150 is such that each slider is connected to an end of a transformer winding corresponding with the connection of the other slider to the end of its transformer winding. The transformer 148 includes a pair of secondary windings 152, 153, and transformer 151 includes a pair of transformer secondary windings 154, 155. A conductor 156 connects the assumed negative end of winding 152 to the positive end of winding 154. A resistor 158 of a voltage dividing potentiometer 157 is connected across the remaining two ends of secondary windings 152, 154. Potentiometer 157 includes an adjustable tap 159. The assumed positive end of winding 153 is connected by conductor 160 to the assumed positive end of winding 155. A resistor 163 of a second voltage dividing potentiometer 162 is connected between the assumed negative end of winding 153 and the negative end of winding 155. The voltage divider 162 includes an adjustable tap 164 which is connected by a conductor 165 to the assumed negative end of winding 154. An output conductor 166 extends from adjustable tap 159 and a second output conductor 167 extends from the assumed negative end of winding 155.

In the arrangement 130, the acceleration of the craft normal to the craft pitch axis is derived from secondary windings 152, 154 which are connected in series summing relationship. The angular acceleration of the craft is provided by windings 153, 155 which are connected in series opposition. This connection of windings 153, 155 in series opposition is necessitated because the angular acceleration of the craft about its pitch axis has an opposite effect on accelerometers 131, 139. If the accelerometers are equally spaced longitudinally from the C.G. of the aircraft, and if their responses were the same, and further if the voltages in windings 153 and 155 were in series summing relation they would cancel each other and thus no angular acceleration of the craft would be obtained. The A.C. output signal across conductors 166 and 167 which is a combination generally of both normal and angular accelerations may be utilized to control a suitable amplifier corresponding with amplifier 90 of Figure 1.

It may be assumed that amplifier 90 Figure 1 includes any necessary means for converting the D.C. signal across terminal 91, 92 provided by the arrangement 72 to a suitable A.C. voltage for amplifying purposes. In the application of the arrangement 130 Figure 2, to an amplifier such as amplifier 90 in Figure 1, the provision of any modulator for the control voltage is unnecessary. Magnetic amplifiers commonly operate by virtue of a D.-C. control current flowing through control windings of partially saturated reactors. Because magnetic amplifiers are sometimes considered more reliable than electronic amplifiers, this type could be used in Figure 1, item 90, using the D.-C. input from conductors 88 and 89.

In the monitoring 98, Figure 1, the winding 104 is illustrated as opposing the effect of winding 103. While some mechanical biasing means could be used in place of winding 104, I prefer to use the winding 104 since any voltage changes involving the energization of winding 103 because of the variation in the power supply voltage across terminals 93, 94 has an equal effect on winding 104. Also it is fail-safe since loss of reference voltage does not permit engagement of the unprotected autopilot.

Figure 3:
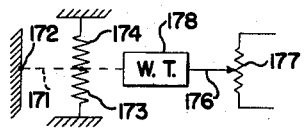
Figure 3 illustrates a form of suitable accelerometer.

Figure 3 illustrates a suitable type of accelerometer 170 having an arm 170 with a pivotal mounting 172. Springs 173, 174 connected to arm 171 and a fixed part normally center arm 171 so that a slider 176 carried on the end of arm 171 is centered on a potentiometer resistor 177. The arm 178 supports intermediate its ends a suitable weight 178. The accelerometer 170 is so mounted in the craft as to be responsive to up or down accelerations of the craft where it is located.

While normal acceleration under many flying conditions may serve as a sufficient source of disengage control signal, during maneuvering of the aircraft, normal acceleration is generally preceded by an angular acceleration. Thus if normal acceleration follows angular acceleration, I prefer to derive the limit functions signal from both the craft normal acceleration and the craft angular acceleration so that an anticipatory effect is provided in the limit function signal by the angular rate signal. A limit function in terms of accelerations of the craft which will render the servomotor that positions an attitude control surface of the craft ineffective when the limit function is obtained.

While the primary function of the disengagement arrangement is to prevent overstressing of the craft, it is apparent that factors which overstress the craft also have an undesirable effect on occupants of the aircraft and in a broad sense, the device also serves as a safeguard both to the craft and an aid to comfort of its occupants.

As many other embodiments may be made of the above invention and as various changes may be made in the embodiment described, it will be understood that the matter herein set forth is to be interpreted as illustrative of the invention and not in a limiting sense.

What is claimed is:

1. Control apparatus for an aircraft having an attitude control device and servomotor means to which the device may be operatively connected and disconnected, said apparatus comprising: a pair of accelerometers longitudinally spaced on opposite sides of the center of gravity of the craft, two variable magnitude voltage signal generators, one responsive to one accelerometer and the second responsive to the other accelerometer; means connected to said generators and combining said voltage signals to provide an output voltage having craft normal and craft angular acceleration components; further means responsive to the output voltage for operatively disconnecting said motor means and attitude control device; and control means for operating said motor means.

2. Control apparatus for an aircraft having an attitude control device and operating means to which the device may be operatively connected and disconnected, said apparatus comprising: a pair of accelerometers longitudinally spaced on opposite sides of the center of gravity of the craft; two variable magnitude voltage signal generators each responsive to one accelerometer; means connected to said generators and combining said voltage signals to provide an output voltage having craft normal and craft angular acceleration components; means responsive to the output voltage for disconnecting said operating means and attitude control device; and control means for controlling operation of said operating means.

3. Control apparatus for an aircraft having an elevator control surface and motor means to which the surface may be operatively connected and disconnected; said apparatus comprising: a pair of accelerometers longitudinally spaced on opposite sides of the center of gravity of the craft and each accelerometer being responsive to linear accelerations; two variable magnitude voltage signal generators each responsive to one accelerometer; combining means connected to said generators and providing an output voltage having craft normal and craft angular acceleration components; further means responsive to the output voltage for operatively disconnecting said motor means and control surface; and control means for operating said motor means.

4. Control apparatus for an aircraft having attitude control surfaces and motor means to which the surface may be operatively connected and disconnected, said apparatus comprising: a pair of linear responsive accelerometers spaced on opposite sides of the center of gravity of the craft; two variable magnitude voltage signal generators each responsive to one accelerometer; combining means connected to said generators and providing an output voltage having craft normal and craft angular acceleration components; further means responsive to the output voltage for rendering said motor means ineffective on said control surface; and control means for operating said motor means.

5. In an apparatus for protecting an aircraft against structural overstress, in combination: a pair of accelerometers equally spaced on opposite sides of the center of gravity of the craft on a line through the center of gravity of the craft; two variable magnitude signal generators a first generator operated by one accelerometer and a second generator operated by the other accelerometer; a combining network connected to said generators and supplying an output signal having linear and angular acceleration components; and means connected to receive the output signal from said combining means.

6. In apparatus for protecting an aircraft against structural overstress, in combination: a pair of linear responsive accelerometers spaced on opposite sides of the center of gravity of the craft; two variable magnitude signal voltage generators one operated by one accelerometer and the second operated by the other accelerometer; a combining network connected to said voltage generators and supplying an output voltage signal having linear and angular acceleration components and further means connected to receive said output signal, said further means including means for comparing said output signal.

7. Acceleration monitoring control for an aircraft having two different directions of operation away from a predetermined position including normally effective operating means for operating a surface of said craft in a direction to restore the position; means for detecting the change in position of said craft and controlling said operating means; and accelerometer means providing a predetermined value of acceleration limit function having angular and normal acceleration components and responsive to angular and normal accelerations of the craft for rendering ineffective said operating means on said control surface.

8. In a control system for an object capable of departure from a predetermined condition and having a condition control device, motor means normally effective to position said device; control means responsive to linear accelerations of said object and angular accelerations of said object about an axis causing said linear acceleration and defining said predetermined condition; a comparing means connected to said control means and including a standard of the predetermined condition; and further means controlled by said comparing means for rendering said motor means ineffective to position said condition control device.

9. In a control system for an object capable of departure from a predetermined condition and having a condition control device, motor means normally effective to position said control device; a pair of accelerometers spaced on opposite sides of the center of gravity of the object; two voltage signal generators one responsive to one accelerometer and the second responsive to the other accelerometer; combining means connected to said generators and providing an output voltage having linear and angular acceleration components of said objects; a comparing means including a standard of the predetermined condition and connected to said combining means; and means responsive to operation of said comparing means for rendering said motor means ineffective on said condition control device.

10. In apparatus for protecting an aircraft against structural overstress, in combination: a pair of linear motion responsive accelerometers spaced on opposite sides of the center of gravity of the craft; two signal generators one operated by but one accelerometer the second operated by the other accelerometer; a combining network connected to said generators and supplying an output signal having linear and angular acceleration components; and comparing means including a reference voltage means connected to receive said signal.

11. In acceleration monitoring apparatus for protecting an aircraft against structural overstress, in combination: a pair of linear motion responsive accelerometers spaced on opposite sides of the center of gravity of the craft; two signal generators each comprising a potentiometer having a resistor and slider, one slider operated operated by one accelerometer the second slider operated by the other accelerometer; combining means, having output elements connected to said sliders and connecting center taps of said two resistors together and additionally including a loading resistor connecting one slider to its resistor center tap, to enable said network to supply an output across said sliders having linear and angular acceleration components.

12. In acceleration monitoring apparatus for protecting an aircraft against structural overstress, in combination: a pair of linear motion responsive accelerometers spaced on opposite sides of the center of gravity of the craft and responsive to acceleration along the vertical axis of the craft; two signal generators each comprising a potentiometer having a resistor and slider, each slider operated by but one accelerometer but both accelerometers operating sliders; combining means, having output elements connected to said sliders, connections between center taps of said two resistors, and additionally including a loading resistor connecting one slider to its resistor center tap, to enable said network to supply an output across said output elements having linear and angular acceleration components; and comparing means including a reference voltage means connected to receive said output signal.

13. In acceleration monitoring apparatus for protecting an aircraft against structural overstress, in combination: motor means normally effective to position a control surface of said craft tending to produce accelerations; means for operating said motor means; means responsive to the angular acceleration of the craft about an axis; further means responsive to the acceleration of an aircraft normal to said axis; and additional means responsive to said first means and said further means for rendering said motor means ineffective to position said control surface.

14. In monitoring apparatus for protecting an aircraft against structural overstress, said aircraft having an elevator control surface, in combination: motor means normally effective to position said elevator surfaces; operating means for said motor means; first means for generating a voltage signal having a magnitude proportional to the craft angular acceleration about its lateral axis; second means for generating a voltage signal having a magnitude proportional to the acceleration of the craft normal to the lateral axis; and control means responsive to said first and second means for rendering said motor means ineffective on said elevator surface.

15. In monitoring apparatus for protecting an aircraft against structural overstress, said aircraft having an elevator control surface, in combination: motor means normally effective to position said elevator surface; operating means for said motor means; first means generating a voltage signal proportional to the craft angular acceleration about its lateral axis; second means generating a voltage signal proportional to the acceleration of the craft normal to the lateral axis; comparing means including a reference voltage means connected to receive said signals from said first and second means; and means effective when said voltage from said first and second means exceeds said reference voltage means for rendering said motor means ineffective to position said elevator surface.

16. In an aircraft having an elevator control surface for moving the craft about its lateral axis, an automatic pilot having a servomotor normally connected to said surface; means for producing a signal in said automatic pilot in accordance with the change in attitude and operating said surface; a first accelerometer means responsive to motion of the craft about said lateral axis; a second accelerometer means responsive to motion of the craft normal to said lateral axis; means for combining the effects of said first and second means; comparing means including a standard of comparison connected to said combining means; and further means responsive to said composing means for rendering said autopilot ineffective on said surface.

17. In an aircraft having an elevator control surface for moving the craft about its lateral axis, an automatic pilot having a servomotor normally connected to said surface; means for producing a signal in said automatic pilot in accordance with the change in attitude and operating said surface; a first accelerometer means responsive to motion of the craft about said lateral axis; a second accelerometer means responsive to motion of the craft normal to said lateral axis; means for combining the effects of said first and second means; comparing means including a standard of comparison connected to said combining means; and further means responsive to said comparing means for rendering said autopilot ineffective on said surface, in which said first and second means include in common a pair of accelerometers spaced on opposite sides of the center of gravity of the craft.

18. In an aircraft having an elevator control surface for moving the craft about its lateral axis, an automatic pilot having a servomotor normally connected to said surface; means for producing a signal in said automatic pilot in accordance with the change in attitude and operating said surface; a first accelerometer means responsive to motion of the craft about said lateral axis; a second accelerometer means responsive to motion of the craft normal to said lateral axis; means for combining the effects of said first and second means; comparing means including a standard of comparison connected to said combining means; and further means responsive to said comparing means for rendering said autopilot ineffective on said surface in which said comparing means comprises a displaceable circuit controller displaceable in one direction in accordance with the effect from said and combining means and displaceable in an opposite direction in accordance with a reference means.

19. In an automatic steering system for a mobile craft having a displaceable control surface thereon for controlling the craft about an axis thereof, said system comprising a servomotor normally effective to position said surface, in combination: position maintaining means for generating a signal when the craft departs from a predetermined position for operating said motor whereby the surface is displaced to restore the craft to the predetermined position; acceleration limiting means responsive to angular accelerations of the craft about said axis and accelerations of the craft normal to said axis and having an output dependent on the magnitude of both accelerations; and means responsive to said acceleration limiting means when the output reaches a predetermined magnitude for rendering said servomotor ineffective on said control surface.

20. In apparatus for controlling the pitch attitude of an aircraft, in combination: a first linear accelerometer spaced longitudinally along the craft on one side of the center of gravity of the craft; a first variable phase and magnitude voltage generator operated by said first accelerometer; a second linear accelerometer spaced equally to the first accelerometer from the center of gravity but on opposite side of the center of gravity; a second variable phase and magnitude voltage generator operated by said second accelerometer; voltage combining means connected to said two generators and providing an output voltage having craft normal and craft angular acceleration components; and means responsive to said output voltage.

21. In apparatus for controlling the pitch attitude of an aircraft, in combination: a first device operable in two directions from a normal position and spaced on one side of the center of gravity of the craft and responsive in the same direction to two flight conditions of the craft and providing a first variable signal; a second device operable in two directions from a normal position and spaced equally to said first device from the center of gravity of the craft but on opposite side thereof and responsive in opposite directions to said two flight conditions and providing a second variable signal; signal combining means connected to said devices and providing an output signal having components in accordance with changes in said first and second conditions; and means responsive to said output signal.

22. In apparatus for controlling the pitch attitude of an aircraft, in combination: a first variable magnitude signal generator on said craft displaced from the center of gravity thereof and responsive to normal acceleration of the craft and another flight condition of the craft which is a derivative of pitch attitude of the craft; a second variable magnitude signal generator on said craft positioned equally from the center of gravity of the craft as said first generator but on opposite side of the center of gravity and responsive to the normal acceleration of the craft and said other flight condition of the craft; signal combining means connected to both generators and providing an output signal having normal acceleration and said other flight condition components; and means responsive to said output signal.

23. In apparatus for controlling the attitude of an aircraft, in combination: a first device movable various extents in two directions from a normal position and responsive in the same direction to two flight conditions of the craft and providing a first variable magnitude signal; a second device movable various extents in two directions from a normal position and so positioned on said craft as to be responsive in opposite directions to the two flight conditions and providing a second variable magnitude signal; signal combining means connected to said devices and providing an output signal having components of said first and second conditions; and means responsive to said output signal.

24. In apparatus for an aircraft having motor means for controlling attitude of the craft; control means for said motor means, and means operatively connecting said control means to said motor means, in combination: monitoring means for effecting operable condition of said connecting means; said monitoring means including a switch, a fail safe source of voltage for closing said switch to render effective said connecting means; a first device spaced on one side of the center of gravity of the craft and responsive to a flight condition of the craft and providing a first variable signal; a second device spaced equally to said first device from the center of gravity of the craft but on opposite side thereof and responsive to said flight condition and providing a second variable signal; signal combining means connected to said devices and providing an output signal; and means responsive to said output signal for operating on said switch in opposition to the effect of said fail safe means.

25. In condition control apparatus, in combination: means including a first signal generator movable various extents in two directions from a normal position and responsive by movement in the same direction to two conditions; means including a second signal generator movable various extents in two directions from a normal position and arranged to respond by movement in opposite directions to the two conditions; signal combining means connected to both signal generators and providing an output signal having components of both said conditions so that such components are obtained irrespective of the directions of change of both conditions and the equality of magnitudes of such changes; and means responsive to said output signal.

26. In control apparatus, in combination: a first device movable in two directions from a normal position and responsive by movement in the same direction to changes in two conditions; a first variable magnitude signal voltage generator operated by said device; a second device movable in two directions from a normal position and responsive by movement in the same direction as said first device from changes in one condition and oppositely responsive to changes in the other of said two conditions; a second variable magnitude signal voltage generator operated by said second device; signal voltage combining means connected to both generators and providing an output signal voltage having components indicative of changes in both conditions, whereby an output signal voltage is obtained irrespective of whether said conditions vary in the same amount but in opposite directions; and means responsive to said output signal voltage.

References Cited in the file of this patent

UNITED STATES PATENTS

| | | |
|---|---|---|
| 2,203,061 | Schmettow | June 4, 1940 |
| 2,604,613 | Klass | July 22, 1952 |
| 2,659,041 | Kutzler | Nov. 10, 1953 |
| 2,672,334 | Chenery | Mar. 16, 1954 |
| 2,674,711 | MacCallum | Apr. 6, 1954 |
| 2,770,429 | Schuck, et al. | Nov. 13, 1956 |